United States Patent
Woodell et al.

(10) Patent No.: US 6,882,302 B1
(45) Date of Patent: Apr. 19, 2005

(54) ENHANCED ADAPTIVE WEATHER THRESHOLDS FOR IDENTIFICATION OF HAZARDS SYSTEM AND METHOD

(75) Inventors: Daniel L. Woodell, Robins, IA (US); Roy E. Robertson, Marion, IA (US)

(73) Assignee: Rockwell Collins, Cedar Rapids, IA (US)

(*) Notice: Subject to any disclaimer, the term of this patent is extended or adjusted under 35 U.S.C. 154(b) by 0 days.

(21) Appl. No.: 10/667,701

(22) Filed: Sep. 22, 2003

(51) Int. Cl.$^7$ .............................................. G01S 13/95
(52) U.S. Cl. .................. 342/26 R; 342/26 B; 342/179; 342/181
(58) Field of Search ................. 342/26 R, 26 A–26 D, 342/175, 179, 181

(56) References Cited

U.S. PATENT DOCUMENTS

| | | | |
|---|---|---|---|
| 2,939,129 A | * 5/1960 | Atlas et al. | 342/26 R |
| 5,077,558 A | * 12/1991 | Kuntman | 342/26 R |
| 5,469,168 A | * 11/1995 | Anderson | 342/26 R |
| 5,945,926 A | * 8/1999 | Ammar et al. | 340/970 |
| 6,122,040 A | * 9/2000 | Arita et al. | 356/4.01 |
| 6,340,946 B1 | * 1/2002 | Wolfson et al. | 342/26 R |
| 6,356,227 B1 | * 3/2002 | Gibson et al. | 342/25 R |
| 6,828,922 B1 | * 12/2004 | Gremmert et al. | 340/949 |
| 2003/0001770 A1 | * 1/2003 | Cornell et al. | 342/26 |
| 2003/0078730 A1 | * 4/2003 | Sekiguchi | 701/301 |
| 2003/0088361 A1 | * 5/2003 | Sekiguchi | 701/301 |
| 2003/0097237 A1 | * 5/2003 | Sekiguchi | 702/158 |
| 2004/0054473 A1 | * 3/2004 | Shimomura | 701/301 |
| 2004/0080449 A1 | * 4/2004 | Horibe | 342/70 |
| 2004/0183695 A1 | * 9/2004 | Ruokangas et al. | 340/945 |
| 2004/0227660 A1 | * 11/2004 | Scott | 342/26 R |

OTHER PUBLICATIONS

"Airborne weather radar as an instrument for automatic mapping", Yanovsky, F.J.; Belkin, V.V.; Dzyubenko, V.P.;Microwaves, Radar and Wireless Communications, 2002. MIKON–2002. 14th Int'l Conf on, vol.: 2, May 20–22, 2002, Ps:704–707.*

"The Vertical Profile of Radar Reflectivity of Convective Cell: A strong Indicator of Storm Intensity and Lightning Probability", Zipser, E. J. et al, 1994 American Meteorological Society, pp. 1751–1759.*

"The Vertical Profile of Radar Reflectivity of Convective Cells: A Strong Indicator of Storm Intensity and Lightning Probability?", E. Zipser and K. Lutz, American Meteorological Society, 1994, pp. 1751–1759.

* cited by examiner

Primary Examiner—John B. Sotomayor
(74) Attorney, Agent, or Firm—Nathan O. Jensen; Kyle Eppele

(57) ABSTRACT

A weather radar display system is disclosed. The weather radar display system comprises a weather radar antenna, processing electronics, coupled to the weather radar antenna, enhancing weather radar returns based on a reflectivity model which differentiates lower level activity from higher level activity when the weather activity is detected from weather systems at long range and the reflectivity using short range thresholds would display only higher level activity. A weather radar display displays multiple colors representative of the different levels of weather activity based on the enhanced returns.

20 Claims, 7 Drawing Sheets

ENHANCED ADAPTIVE WEATHER THRESHOLDS FOR IDENTIFICATION OF HAZARDS SYSTEM AND METHOD

BACKGROUND

The invention relates generally to enhanced functionality for long range weather radar, in particular, for use on board aircraft.

Typically, when an airborne weather radar is being used to detect weather systems at long ranges, only the strongest portion of the cell is detected, but the radar is unable to detect the lowest level weather cells (i.e. cells within the lowest level of activity) and/or the lowest level portions of a weather cell. In conventional systems, the highest level portion of a cell (i.e. cell portions with the highest level of activity) may be shown in a red color, an intermediate level may be shown in a yellow color, and the lowest level portion of the cell may be shown in a green color. When detecting weather systems at long range, a radar may only display the highest level portion of the cells such that the weather system would appear red, and may also be smaller on the display because the yellow and green portions may not appear. Although these weather systems may be at long range, pilots piloting the aircraft often do not feel comfortable with the look of the display because they see weather systems which look atypical, that is, the weather systems are purely red or red and yellow and do not have either yellow and/or green fringes. Further, lower level cells may not appear at all. In some attempts to solve this problem, the thresholds for the display are changed for the long range systems. However, by changing the thresholds the weather systems are not detected accurately and still appear atypically to pilots who do not feel comfortable with the appearance because they do not appear the same as conventional weather cells.

Another problem with conventional weather radar systems is that when long lines of thunderstorms appear at long range, the weather radar may not be suitable for displaying the lower level areas of the thunderstorm line. Pilots wish to have the lowest level information in order to detect and plan a location in which they may penetrate and cross the line of thunderstorms, through the lowest level cells.

Accordingly, there is a need for a system and method which is capable of using a model of typical weather cells to provide lower level fringes about the center of a high level weather cell detected at long range. Further, the model may also include smaller, lower level cells adjacent the main cell which may otherwise not be displayed. Further, there is a need for a system and method for detecting cooler spots or lower level areas in a long line of thunderstorms which are detected at long range. Further still, there is a need for a system and method which uses averaging algorithms over small portions of reflectivity data on a long line of thunderstorms detected at long range.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One example of the invention relates to a weather radar display system. The weather radar display system comprises a weather radar antenna. The weather radar display system also comprises a processing electronics, coupled to the weather radar antenna, enhancing weather radar returns based on a reflectivity model which differentiates lower level activity from higher level activity when the weather activity is detected from weather systems at long range and the reflectivity using short range thresholds would display only higher level activity. Further, the weather radar display system comprises a weather radar display displaying multiple colors representative of the different levels of weather activity based on the enhanced returns.

Another example of the invention relates to a weather radar display system. The weather radar display system comprises a weather radar antenna. The weather radar display system also comprises processing electronics, coupled to the weather radar antenna, enhancing weather radar returns of long lines of storms detected at long range, the enhancement based on local averaging of weather radar returns, and produced in an iterative process. Further, the weather radar display system comprises a weather radar display displaying multiple colors representative of the different levels of weather activity based on the enhanced returns.

Yet another example of the invention relates to a method of processing weather radar display returns from long range weather radar. The method includes receiving the weather radar returns, providing a model of conventional weather systems, applying the model to the received weather radar returns, and applying conventional weather radar display thresholds.

Yet still another example of the invention relates to a method of processing weather radar display returns from long range weather radar. The method includes receiving the weather radar returns, averaging a first subset of the weather radar returns, and adjusting the individual values of the first subset based on the averaging.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
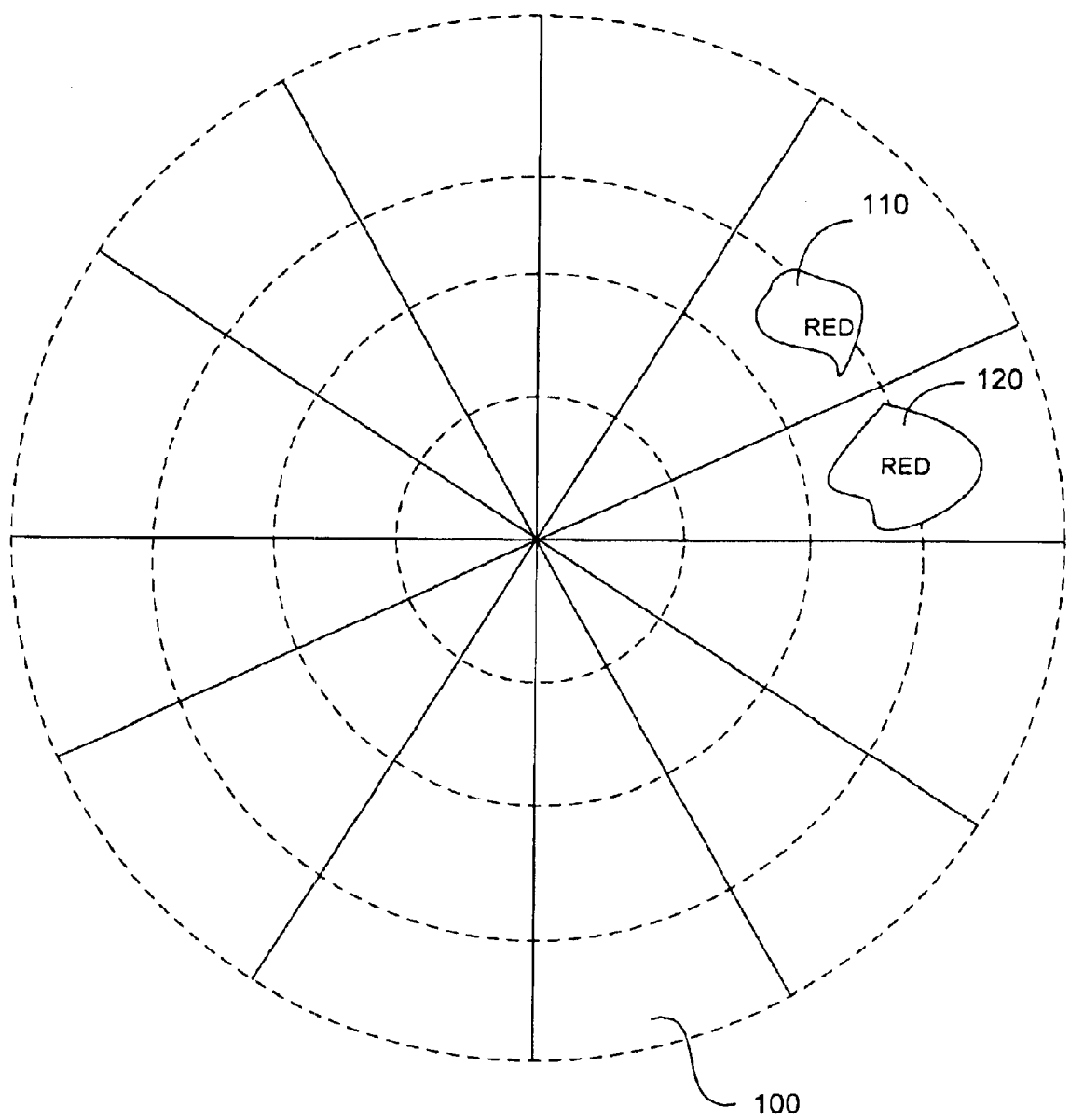
FIG. 1 is an exemplary depiction of a weather radar display in which the display shows a high level weather system detected at long range.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Accordingly, the invention embodies two weather radar enhancements. First, in situations where only higher radar reflectivities are detectable (at long range) generally lower reflectivities will surround those areas, these areas being below minimum detection level. In conventional weather radars, the least detectable returns are always displayed in the lowest precipitation encoded colors, even if only high precipitation rates are detectable. This presents to the pilots the familiar green on the outside, yellow next, and possible red core weather representation. For a "calibrated radar response", only yellow or red may be detectable at some long ranges. Conventional methods, therefore, under-display the amount of higher level colors to produce the familiar display. Displaying colors in a calibrated fashion, conserves the amount of high level reflectivity seen on the radar display, but displays this without familiar lower level fringes. Modeling the typical fall-off in estimated reflectivity level allows the fringe to be recreated, approximating the undetectable fringe around the real detectable high level weather. Frontal activity many times generates lines of thunderstorm cells. This technique can string these cells together to produce the line feature that may be real in these situations.

In a second enhancement, the wide azimuth coverage of a weather radar beam along with the wide spacing of displayable colors, produces displays of lines of weather which fall within the same color encoded weather level. In most cases, local convection produces higher precipitation rates unless higher radar reflectivity is in and around the cores of convective weather cells. An adaptive weather threshold system that stretches the local reflectivity can improve the ability to find convective weather cores because of their higher reflectivity. This enhancement may be done with either a one dimensional or two dimensional constant false alarm re-processing (CFAR) like process or a local Laplacian filter. Because this increases the apparent reflectivity gradient displayed to the air crew, this function may be used when necessary. For example, the function may be smoothly added as the aircraft reaches applicable altitudes and latitudes.

Referring now to FIG. 1, a weather radar display which may be typically used on an aircraft is depicted. The weather radar display 100 is shown displaying two thunderstorm cells 110 and 120 which are detected at long range. Cells 110 and 120 are conventionally shown as high level cells and therefore are shown in red. However, because the cells are being detected at long range, the lower level reflectivity portions of the cells fall below the noise floor of the radar and are thus not detected. Further, the boundaries of the higher level cells may not be accurate. Accordingly, pilots using such systems feel uncomfortable with the use of such systems because they are used to seeing thunderstorm cells which typically have a high level center region surrounded by fringes of lower level areas which are shown in yellow and green. Through empirical data it may be possible to model these lower level reflectivity portions of the cells which are detected at long range by modeling the areas of lower level activity in the cells and applying the model to the data which is received for detected cells at long range.

Figure 2:
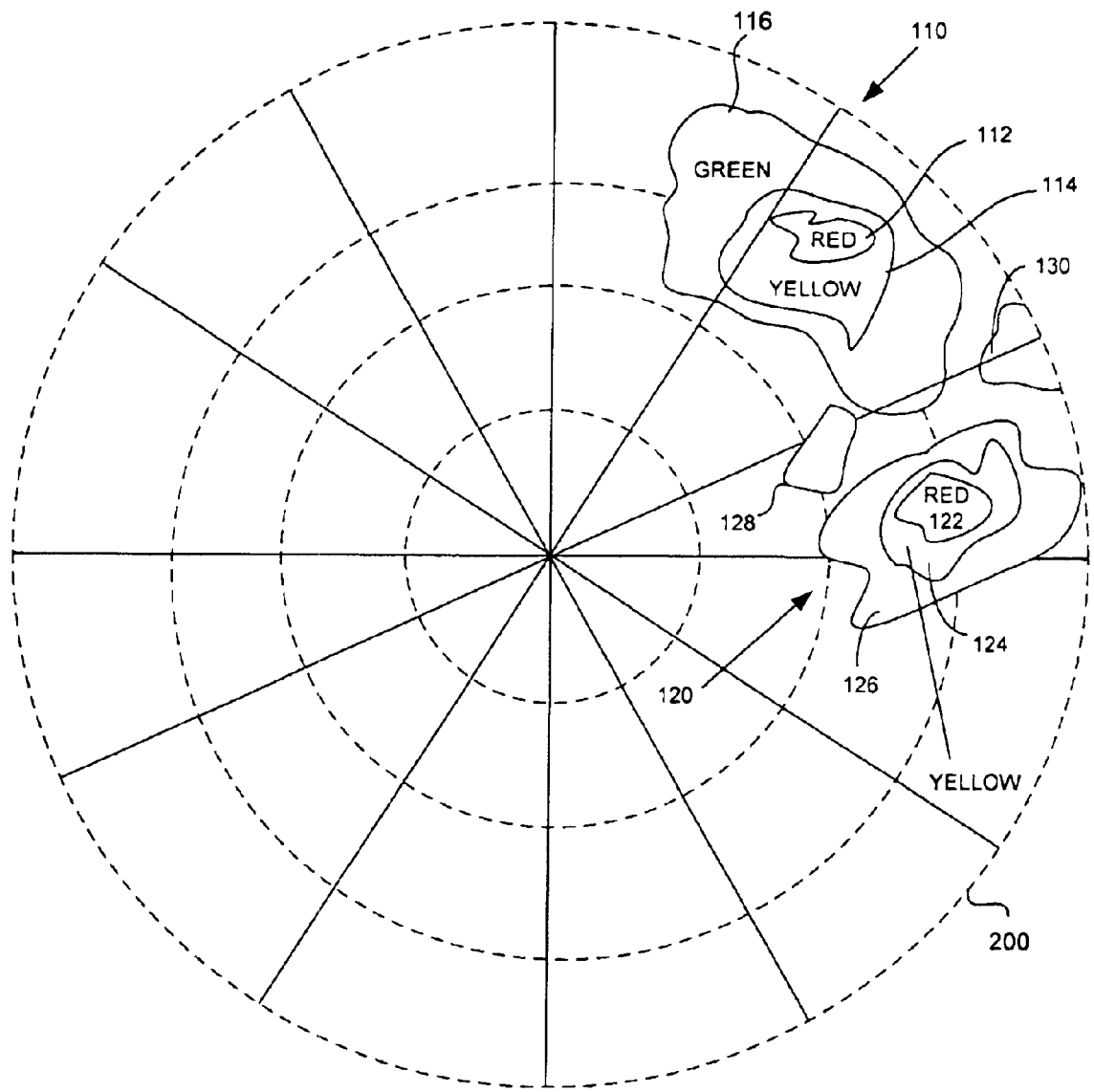
FIG. 2 is an exemplary representation of a weather radar display in which a weather model has been imposed on the weather systems detected and depicted in FIG. 1.

By processing the long range weather data, and using a reflectivity model which may be constructed by theoretical, empirical, or other means, a more conventional representation of the thunderstorms at long range may be provided as depicted in the exemplary depiction of a weather radar display 200 in FIG. 2. Weather radar display 200 provides a more accurate representation of the weather systems 110 and 120 which were depicted in FIG. 1, but having the boundaries of the high level system 112 and 122 being revised based on the reflectivity model as well as lower level areas 114 and 124 which are intermediate level areas as well as lower level areas 116 and 126 which are lower level areas of the storm systems. Further, based on the reflectivity model, there may be other areas of low level activity such as areas 128 and 130 which may not appear in using the conventional weather radar display system.

Figure 6:
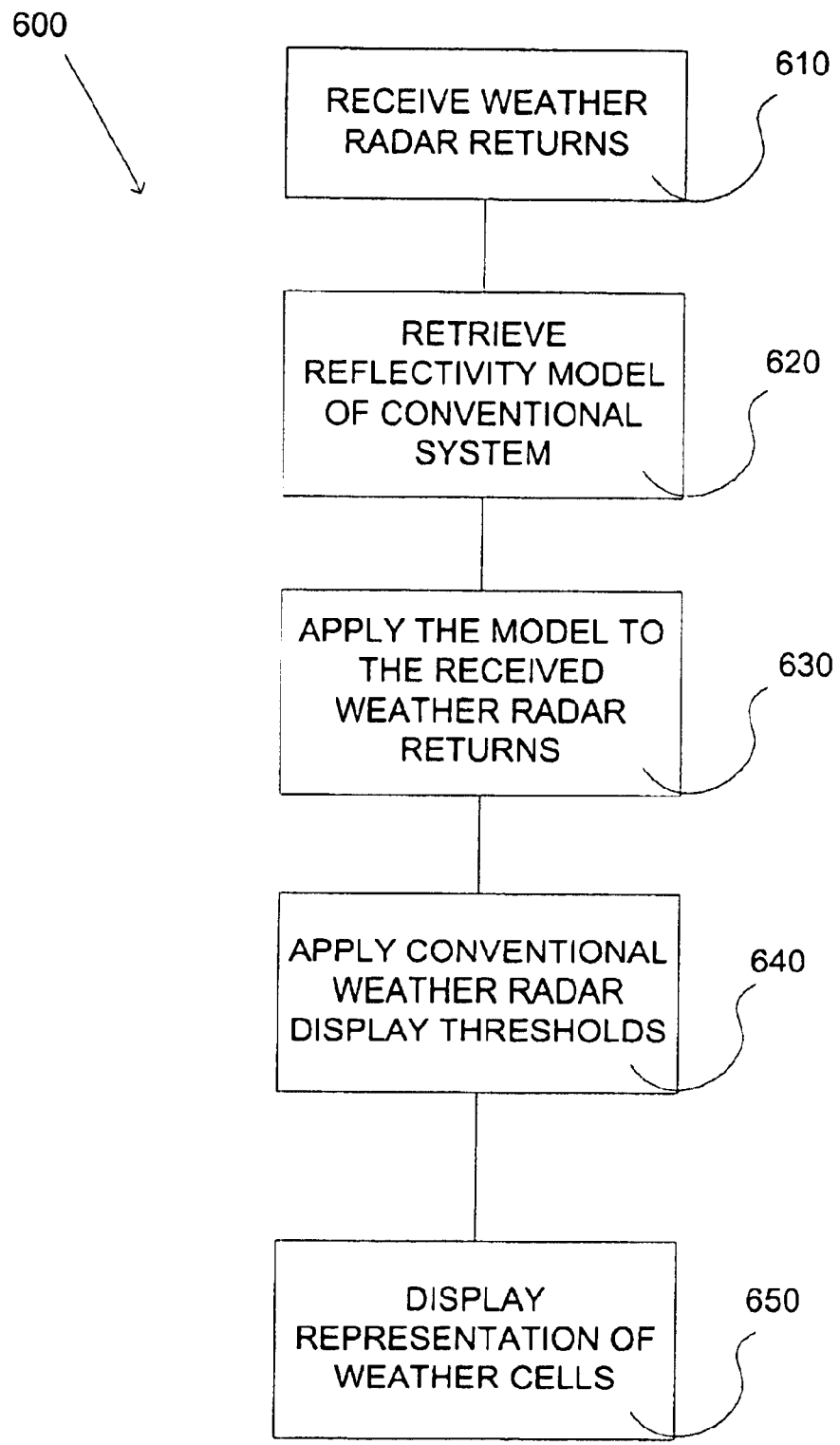
FIG. 6 is an exemplary depiction of a process for enhancing weather radar returns for weather systems detected at long range.

Referring now to FIG. 6, a process 600 is depicted for enhancing weather radar display. Process 600 includes the receiving of weather radar returns via a weather radar antenna and circuitry (step 610). Once the weather radar returns have been received, a reflectivity model may be retrieved from memory, the reflectivity model relating to conventional weather systems (step 620). The model is then applied to the received weather radar returns (step 630). Thereafter, conventional weather radar display thresholds are applied (step 640), such that colors may be presented on the display which are representative of activity in the weather cells (step 650).

Accordingly, by providing post-processing of the weather radar data based on a reflectivity model, a more accurate representation of the weather radar display system may be provided to a pilot and thereby providing a certain level of comfort with the weather radar display which may otherwise be unrealized.

Figure 3:
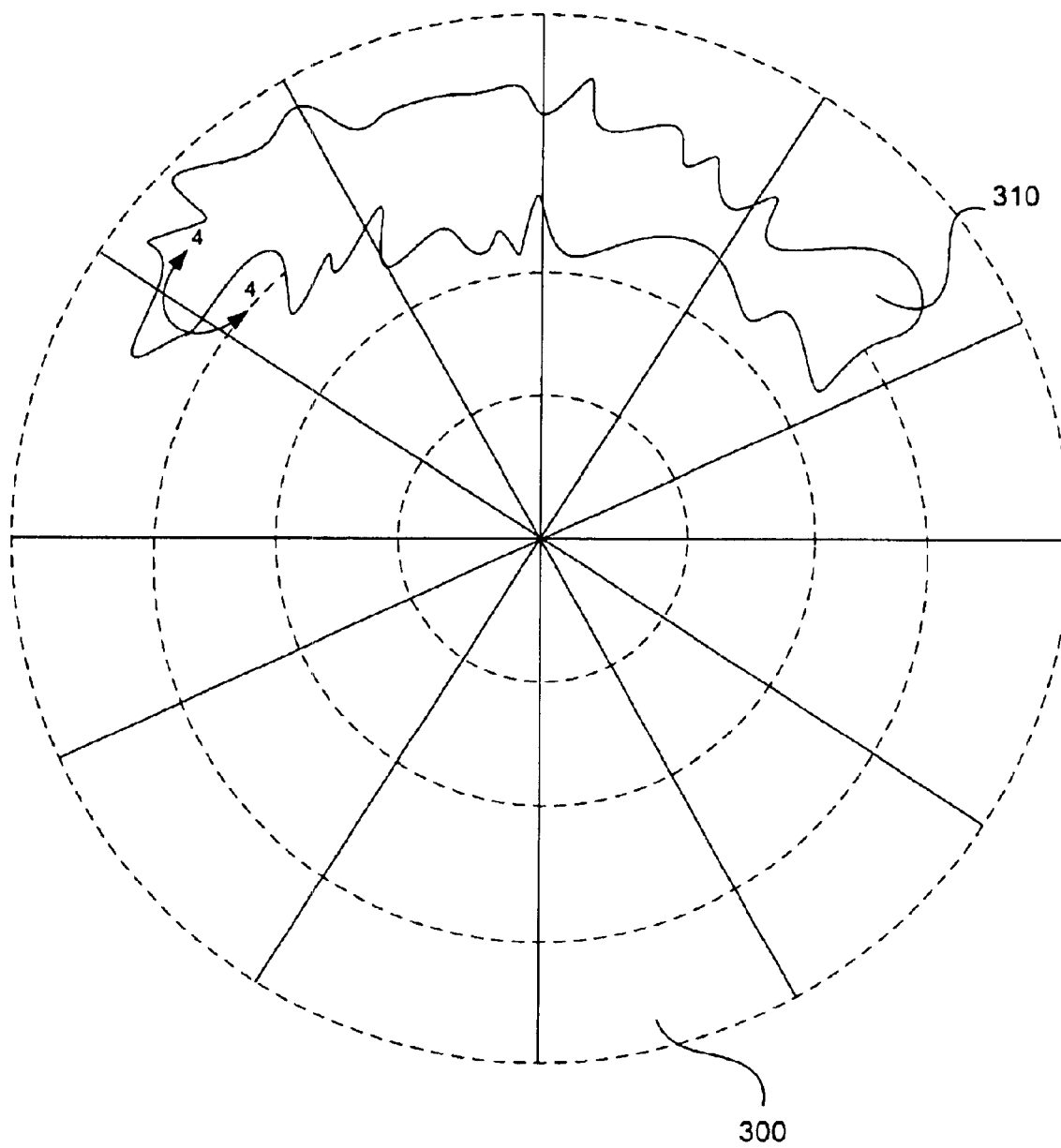
FIG. 3 is an exemplary depiction of a long line of thunderstorms that is detected at long range in a conventional display system.

Referring now to FIG. 3, a weather radar display 300 is depicted. Weather radar display 300 depicts a long line of thunderstorms 310 which are detected at long range. Such long lines of thunderstorms often occur in the intertropical convergence zones and may require pilots to fly along the line of thunderstorms for periods of as long as two hours in order to detect an area which is inactive enough to pass through. Therefore, it is desirable for a pilot to have information on the more inactive or cooler spots of the thunderstorm line when they are detected at long range so that pilots may plan their flight path in advance and thereby save time and fuel, as well as avoid action areas of the storm line. The long line of thunderstorms 310 detected using a conventional weather radar display system may show the entire long line of thunderstorms as high level thunderstorm activity. Accordingly, the pilots may be unable to detect, when they are at long range, areas in which they can fly through and avoid high level areas.

Because the antenna radar beam is broad, when detecting at long range, and the difference of thresholds between weather is large, the long line of thunderstorms typically comes out as high level activity. However, in reality, parts of this long line of thunderstorm activity are cooler, that is, they have less activity than other areas and thus it is desirable to be able to detect such areas. In order to do this, more localized information is used.

Figure 4:
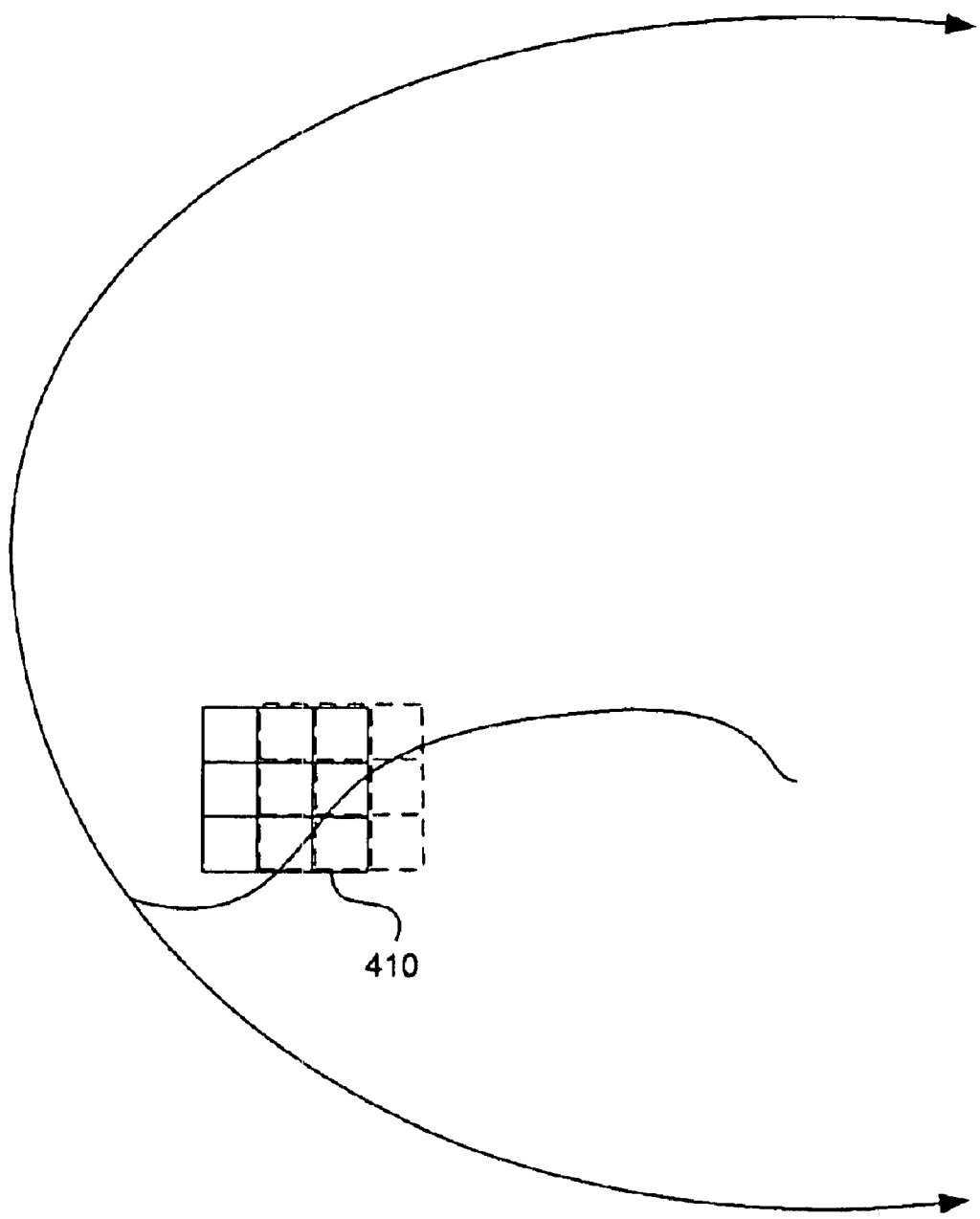
FIG. 4 is an exemplary depiction of the region taken from section 4—4 of FIG. 3 and showing an exemplary methodology for post-processing the weather radar data.

For example, referring now to FIG. 4 which a section of the display of FIG. 3 taken from the area inscribed by lines 4—4, a grid 410 which in an exemplary embodiment is a 3×3 grid is looked at. In an exemplary process, all of the reflectivity values at each grid location are summed and averaged over the 3×3 grid. Now each grid cell is looked at individually and if it is bigger than the average, it is provided with a value that is perhaps 10 or 20 percent bigger. If at a particular grid location the value is lower then the average, that value is than lowered by the same or possibly a different amount, for example, 10 or 20 percent smaller. In the next part of the process, the 3×3 grid is then shifted over by one cell. Now, using the new values, the average is generated over the grid and the process is carried out in the same manner, that is, each cell is looked at and a determination is made as to whether the value is above or below the average, and then is adjusted up or down accordingly. By carrying out this process over the area of the long range thunderstorms, a better differentiation as to the stronger and weaker spots in the thunderstorm system is derived.

Figure 5:
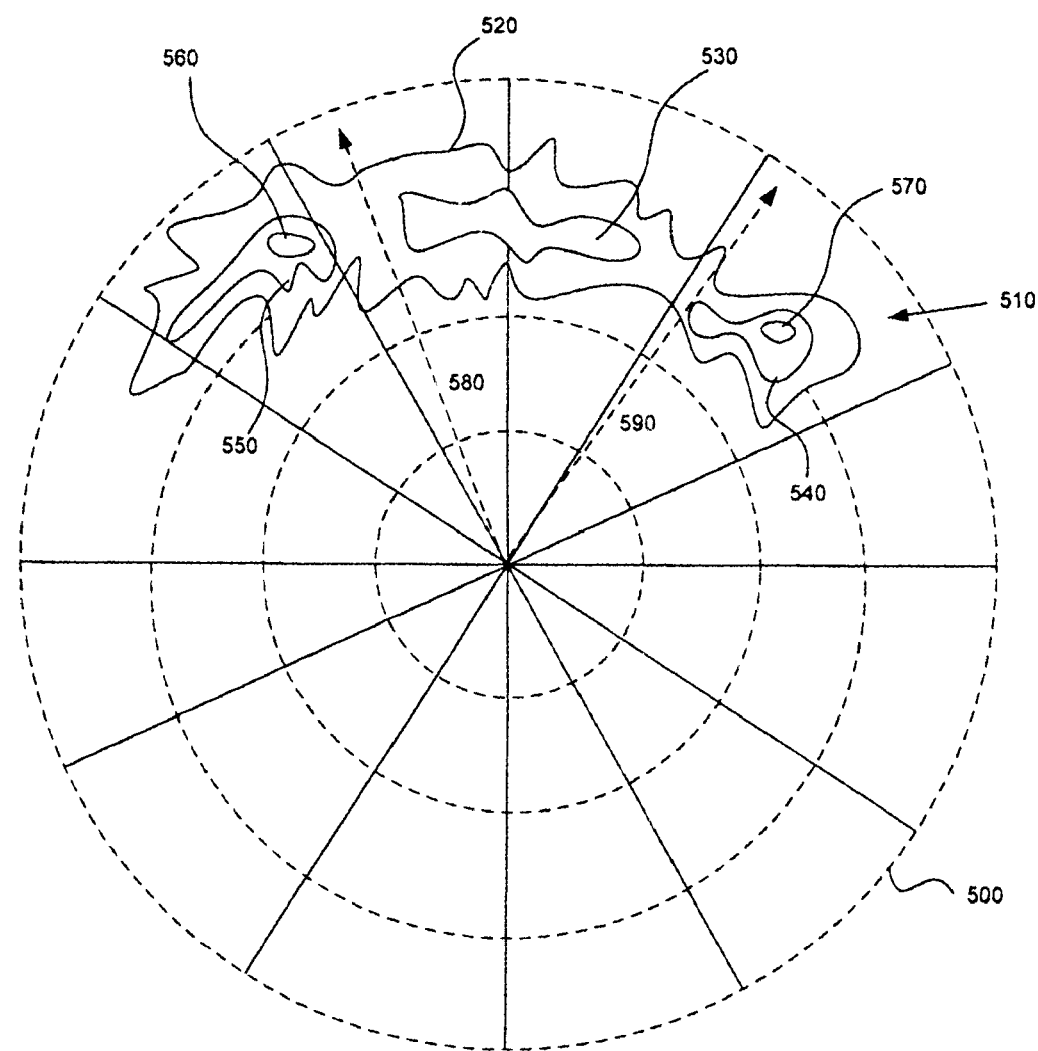
FIG. 5 is an exemplary depiction of a weather radar detecting a long line of thunderstorms at long range and utilizing post-processing, detecting lower level portions of the weather system cells.

For example, referring now to FIG. 5, a resultant weather radar display 500 showing the long line of thunderstorms depicted in FIG. 3 and using the post-processing technique described with reference to FIG. 4 is depicted. The result is a weather radar display showing a long line of thunderstorms 510 in which an outer fringe 520 shows the weaker areas of the storm system, with intermediate areas 530, 540 and 550 also being derived. Further, the strongest areas 560 and 570 are also derived. Accordingly, using a display such as display 500, a pilot may see opportunities to fly through or penetrate the thunderstorms such as along a path 580 or 590.

The post-processing methodology is not limited to the methodology described with respect to FIG. 4, but other methods which may improve the differentiation of high level and low level zones of a long line of thunderstorms at long range may be used without departing from the scope of the invention. Further, it should be noted that any of a variety of colors, not limited to red, yellow, and green may be used to depict different activity levels of the weather systems described. Furthermore, the inventive concepts described may be applied to any of a variety of weather radar types, including but not limited to WXR-2100 radar available from Rockwell Collins, Inc. of Cedar Rapids, Iowa.

Figure 7:
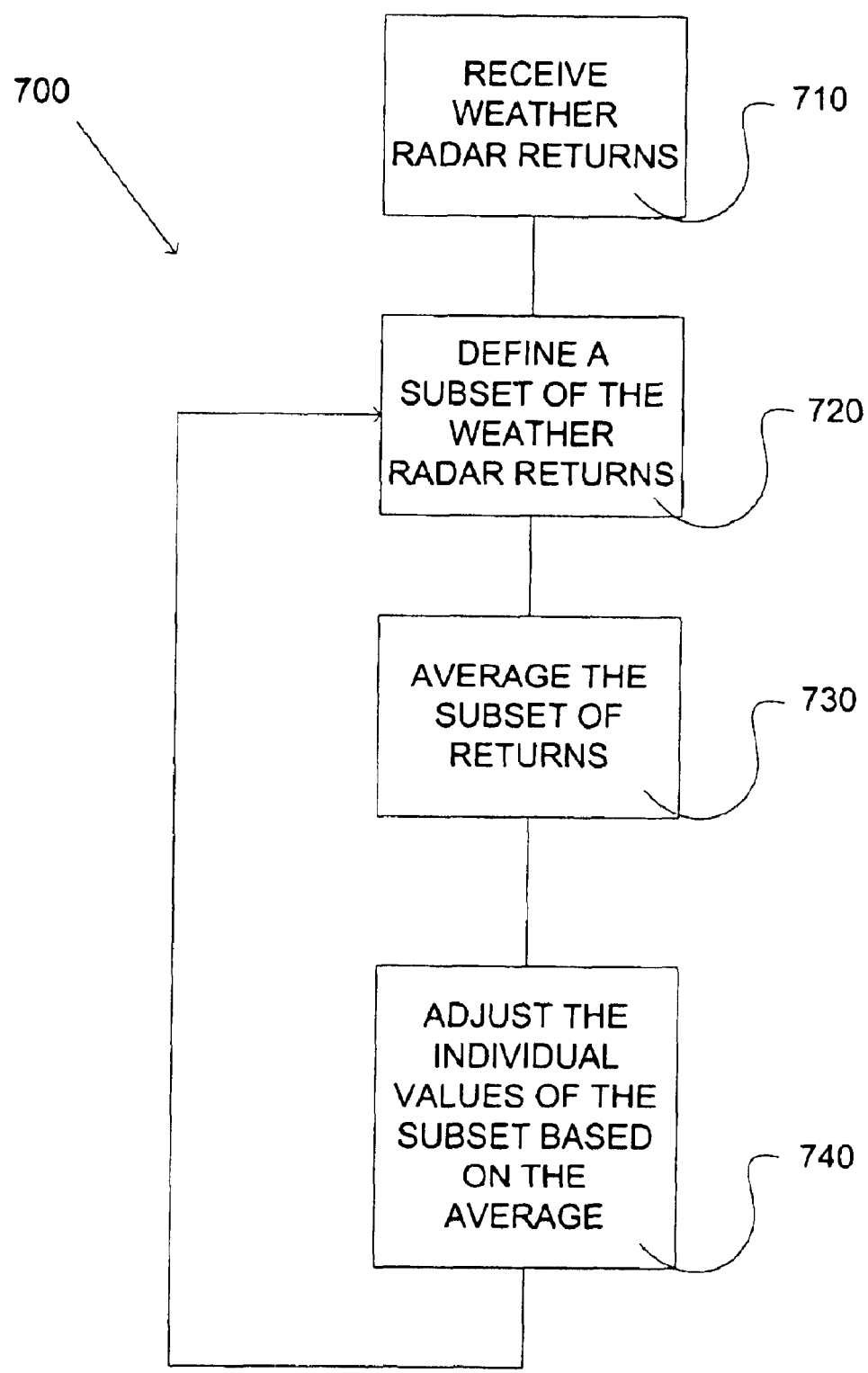
FIG. 7 is an exemplary depiction of a process for enhancing weather radar returns detected from long lines of thunderstorms which are detected at long range.

Referring now to FIG. 7, a process 700 is depicted for enhancing weather radar system when sensing long lines of thunderstorms at long range. Process 700 includes receiving weather radar returns via a weather radar antenna and associated electronics (step 710). A subset of the weather radar returns is defined (step 720). The subset of returns is then averaged (step 730). Each individual value of the subset is adjusted based on the calculated average (step 740). The weather radar returns are updated accordingly and a new subset of weather radar returns is generated (step 720). In exemplary embodiments, the new subset of weather radar returns overlaps but does not include all of the individual elements of the original subset of weather radar returns. This process is carried out in an iterative process and provides better resolution of the activity in the long line of thunderstorms at long range.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the weather radar and processing devices. For example, the type of radar device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar display system, comprising:
   a weather radar antenna;
   processing electronics, coupled to the weather radar antenna, enhancing weather radar returns based on a reflectivity model which differentiates lower level activity from higher level activity when the weather activity is detected from weather systems at long range and the reflectivity using short range thresholds would display only higher level activity; and
   a weather radar display displaying multiple colors representative of the different levels of weather activity based on the enhanced returns.

2. The weather radar display of claim 1, wherein the colors comprise red, yellow, and green.

3. The weather radar display of claim 1, wherein the model is based on empirical data.

4. The weather radar display of claim 1, wherein the model is a mathematical model.

5. The weather radar display of claim 1, wherein the thresholds are not changed from short range thresholds.

6. A weather radar display system, comprising:

a weather radar antenna;

processing electronics, coupled to the weather radar antenna, enhancing weather radar returns of long lines of storms detected at long range, the enhancement based on local averaging of weather radar returns, and produced in an iterative process; and a weather radar display displaying multiple colors representative of the different levels of weather activity based on the enhanced returns.

7. The weather radar display of claim 6, wherein the colors comprise red, yellow, and green.

8. The weather radar display of claim 6, wherein the averaging is carried out over a first subset of the returns and individual values of the subset of returns are adjusted based on the average.

9. The weather radar display of claim 8, wherein the averaging is carried out over a second subset of the returns and individual values of the subset of returns are adjusted based on the average of the second subset.

10. The weather radar display system of claim 9, wherein the second subset overlaps the first subset.

11. A method of processing weather radar display returns from long range weather radar, comprising:

receiving the weather radar returns from long range;

providing a model of the topical estimated fall-off of reflectivity level of conventional weather systems;

applying the model to the received weather radar returns to recreate an approximate and undetectable fringe around the long range weather radar returns which may only detect high level weather activity; and applying conventional weather radar display thresholds.

12. The method of claim 11, wherein the model is based on empirical data.

13. The method of claim 11, wherein the model is a mathematical model.

14. The method of claim 11, further comprising:

displaying a first color on the display for data having values above a first threshold.

15. The method of claim 11, further comprising:

displaying a second color on the display for data having values below a second threshold.

16. A method of processing weather radar display returns from long range weather radar, comprising:

receiving the weather radar returns;

averaging a first subset of the weather radar returns; and adjusting the individual values of the first subset based on the averaging.

17. The method of claim 16, further comprising:

averaging a second subset of weather radar returns; and adjusting the individual values of the second subset based on the average of the second subset.

18. The method of claim 17, wherein the first subset and the second subset overlap and the second subset contains previously enhanced values.

19. The method of claim 16, further comprising:

dividing a region of the weather radar display into a grid.

20. The method of claim 16, wherein the method is applied to storm systems in the intertropical convergence zones.

* * * * *